United States Patent

Thöny

[11] Patent Number: 5,096,236
[45] Date of Patent: Mar. 17, 1992

[54] APPARATUS FOR DETACHABLY CONNECTING TWO PARTS

[76] Inventor: Hans-Jörg Thöny, Jakob-Helbertstrasse 515, FL-9492 Eschen, Liechtenstein, Switzerland

[21] Appl. No.: 302,586

[22] Filed: Jan. 25, 1989

[51] Int. Cl.$^5$ ............................................. E05C 1/00
[52] U.S. Cl. ........................................ 292/32; 24/594; 24/597; 24/674; 411/508; 403/316; 403/324
[58] Field of Search .............. 411/41, 508; 292/32, 292/19, 83, 86; 24/599, 594, 597, 674; 403/316, 324

[56] References Cited

U.S. PATENT DOCUMENTS

| | | | |
|---|---|---|---|
| 1,383,209 | 6/1921 | Iftiger | 285/322 X |
| 1,688,272 | 10/1928 | Fouletier | 24/674 |
| 3,039,802 | 6/1962 | Barry | 294/19 |

FOREIGN PATENT DOCUMENTS

| | | |
|---|---|---|
| 640436 | 1/1937 | Fed. Rep. of Germany . |
| 292941 | 7/1965 | Netherlands . |
| 829531 | 3/1960 | United Kingdom . |
| 1077599 | 8/1967 | United Kingdom . |

Primary Examiner—Dave W. Arola

[57] ABSTRACT

The invention relates to an apparatus for detachably connecting two parts. It has a receiving part (1) which possesses a housing (3a). A lock (5a) which has a bevelled entrance (7a) is mounted in the housing (3a). A locking pin (9d) having a displacement part (12a) is used for locking or for latching with the lock (5a), which is kept pressed in the locking direction by a rubber ring (16). A spring or block acts against movement of the locking pin (arrow 57). An unlocking part (11a) is mounted on the shaft of the locking pin (9d) so that the said unlocking part can slide in the direction of movement (arrow 57). The locking pin (9d) carries a thrust plate (8) on its end facing away from the displacement part (12a). If pressure is exerted on this thrust plate, the displacement part (12a) initially interlocks with the lock (5a). When further pressure is exerted in the direction of movement arrow (57), the unlocking part (11a) forces the lock (5a) apart via the bevelled entrance (7a) and against the spring force of the rubber ring (15), at right angles to the direction of movement (57). The lock (5a) then jams at the displacer contour (17) of the unlocking part (11a). The connection can thus be parted again by pulling the locking pin (9d) out of the receiving part (1). In another embodiment, the lock (5k; 1) is held on the locking pin (9m; n) and the displacement part (12i; k) is held on the housing 3n; m).

10 Claims, 8 Drawing Sheets

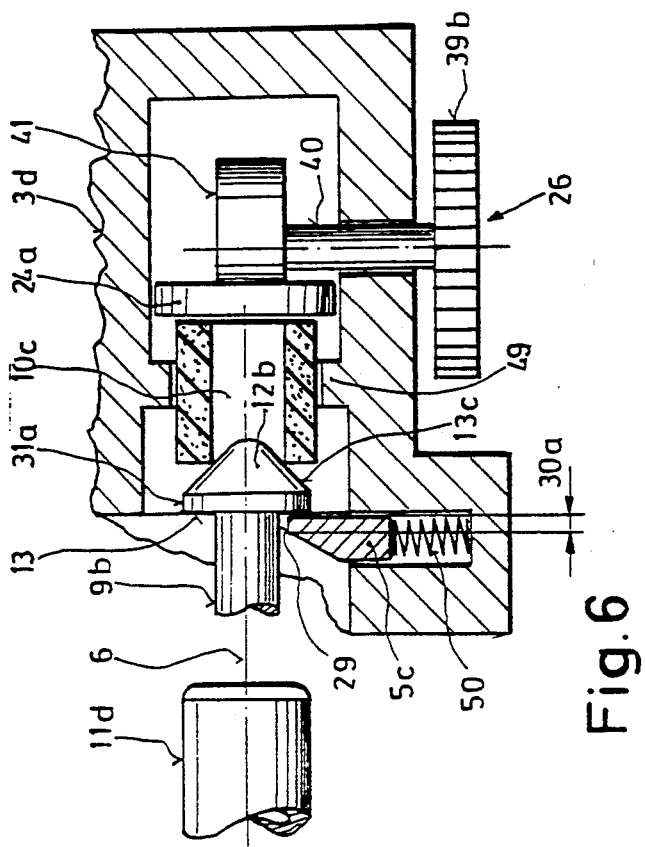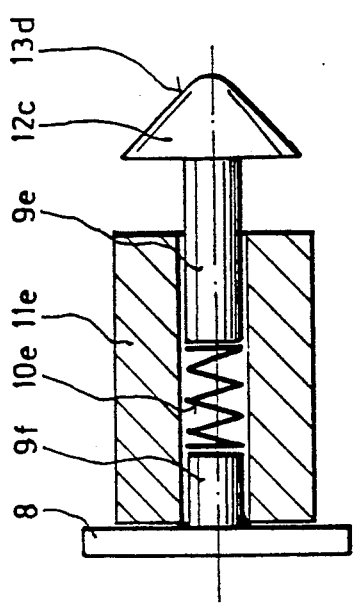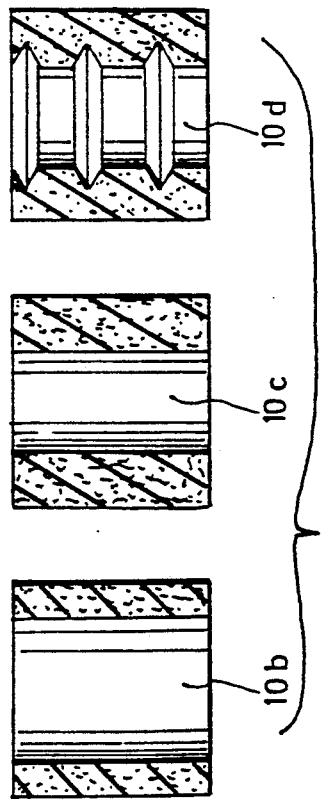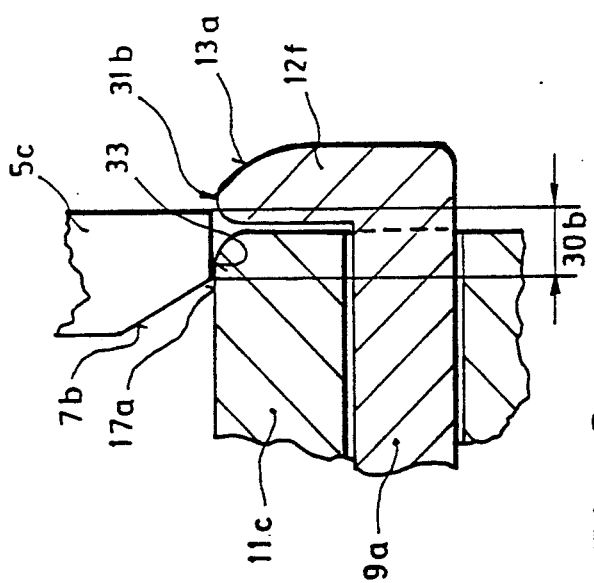

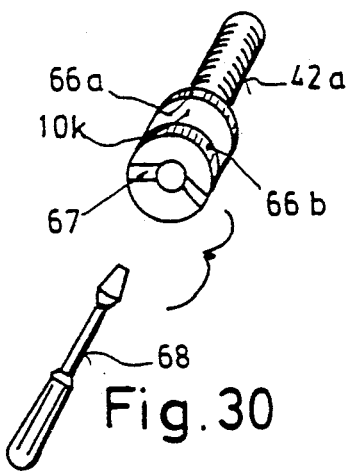
Fig.30
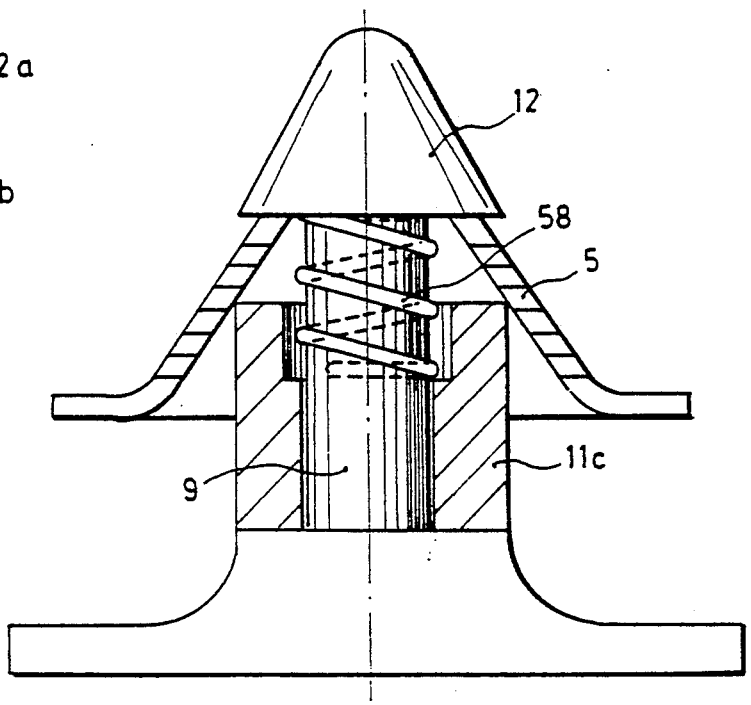
Fig.20
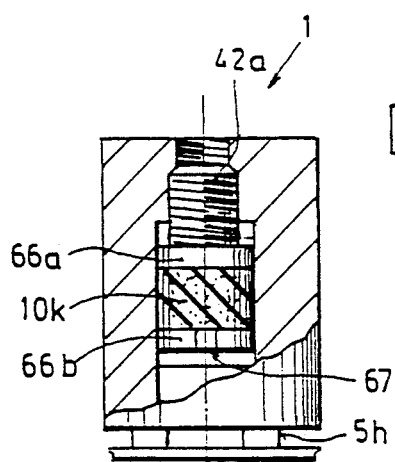
Fig.31
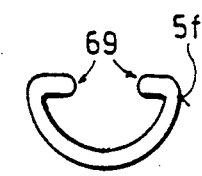
Fig.32
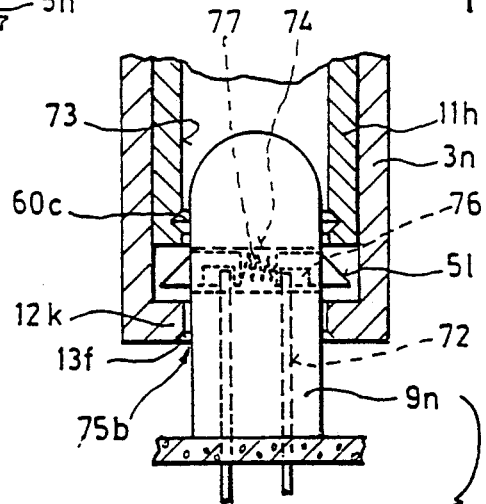
Fig.36
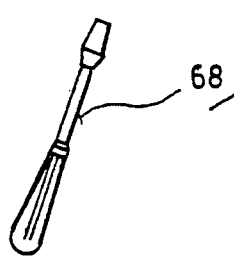

APPARATUS FOR DETACHABLY CONNECTING TWO PARTS

The invention relates to an apparatus for detachably connecting two parts; namely a locking pin, and a receiving part for receiving the locking pin when moved in an inserting direction.

BACKGROUND OF THE INVENTION

For the purpose of the invention, parts are components which are to be connected to one another and then completely detached from one another again. They include, for example, doors and door frames, couplings of hoses, ropes, rods, etc., equipment or the like to be fastened to walls, or wall panels, coverings, etc.

Similar apparatuses have been disclosed in a very wide range of variants, for example, as a truck or hood closure, or as connecting elements for two components provided with flush orifices, as described in, for example, German Offenlegungsschrift 3511070. In all these known systems, one-hand operation is possible only during closing of the apparatus, but at least a second sequence of movements is required for detaching, such as pulling on an opening lever in the case of the vehicle, or pressing a peg or the like (cf. the German Offenlegungsschrift).

It is true that there are also known apparatuses or furniture fittings which are equipped with a toggle lever mechanism and thus permit the opening and closing of doors merely by the application of pressure. These apparatuses, however, are relatively complicated to produce and have a large number of components.

Moreover, overextending the toggle lever results in some cases in a loud snapping noise which may be found unpleasant, for example, in the bedroom area.

Snap-closures having a spring-loaded locking element are also known, for example, ball catches which, although simple to operate in both directions, scarcely offer any more resistance in the opening direction than in the closing direction. The features of the relevant apparatus in the prior art are described most clearly in U.S. Pat. No. 3,039,802. Two spring lips formed as a single piece with a receiver project from the receiver at an angle to one another and lock the displacement part. During the unlocking process they are spread apart by the unlocking part, so that withdrawal of the displacement part and hence unlocking are possible. The spring lips are bent at their connection points to the base part. Thus, bending takes place at this point and, with frequent use, this may lead to weakening of the material and consequently even to fracture. In the locked stage—when the locking pins are subjected to tension—these connection points are likewise subjected to a load.

Finally, the free ends of the spring lips shear both against the displacement part and against the unlocking sleeve, with the result that material wear and undesirable abrasion may occur.

The force of the lock is difficult to adjust, since strengthening of the material simultaneously results in greater spring force and makes locking and unlocking more difficult. Further problems may arise from the leaf spring construction which opposes the locking pin. In order to possess sufficient springiness, these leaf springs must in fact be relatively long and therefore bulky. The total space requirement for the known apparatus is thus considerable, so that it is scarcely suitable for use in, for example, furniture construction. Furthermore, the leaf springs fastened on one side exert a lateral pressure on the locking pin, which may lead to jamming. Conversely, in the case of leaf springs for both sides, a locking pin inserted slightly obliquely can result in lateral tilting of the leaf springs through twisting, which then prevents them from acting in the desired manner and may lead to undesirable locking between the leaf springs and the displacement part. Locking of this type may only be capable of being undone by destruction of the entire closure. Because of their connection to the base part, it is furthermore impossible to replace or adjust the known leaf springs alone. All these disadvantages have obviously meant that the apparatus according to the US Patent has not become established in practice.

OBJECT AND STATEMENT OF THE INVENTION

It is the object of the invention to provide an apparatus which can be produced in a simple, space-saving form with few components but nevertheless permits reliable closing, firm locking and easy detachment, can be operated with one hand and has a long life. Furthermore, the disadvantages of the known apparatuses are to be avoided.

This object is achieved by an apparatus having:

A displacement part on one of the interconnecting parts having a first displacer contour, a spring-loaded lock on the other interconnecting part being moveable by the displacement part from a locking position against its spring-load into an unlocking position, first spring means for biasing the spring-loaded lock into the locking position, second spring means acting against movement of the locking pin in the inserting direction, force adjusting means for adjusting the force of the second spring means, first and second abutment means, a sleeve-like unlocking part supported securely by the locking pin and retained by the first abutment means in one direction along the locking pin and the second abutment means in the opposite direction and having a second displacer contour mounted so that it is moveable along the locking pin, the minimum penetration depth of the locking pin into the receiving part corresponding to the extension of the displacement part in the direction of movement of the locking pin plus clearance and the depth of the spring-loaded lock in the direction of movement of the locking pin.

According to the invention, the entire apparatus thus consists merely of five components, a locking pin, a sleeve-like unlocking part, a spring-loaded lock in the vertical position with respect to the locking pin and a housing having a concentric spring whose force is directed against the locking pin. The parts to be connected are fastened to the locking pin or to the housing, so that the two can be connected to one another. The invention thus provides an apparatus for detachable connection which can be operated with one hand and is lockable and detachable, the locking pin and the housing automatically moving a distance apart during detachment. For example, a door automatically opens a little after unlocking, as is also the case in known toggle lever systems in furniture systems. The concentric arrangement of the spring avoids oblique loads and thus does not interfere with the functioning of the lock;

hence, there is only slight wear of the material. The required penetration depth is obtained from the alternative features in the defining clause of claim 1, the second alternative being shorter overall but less elegant in terms of operation. The inventive effect, however, in the case of one-hand locking or opening is the same. Swivelling in the plane at right angles causes less damage since the swivel joint has to absorb only swivel forces and not locking or retaining forces.

For the purposes of the invention, the locking pin is preferably in the form of a rotating part but the invention also embraces any other shapes for various applications. All that is critical in the case of the locking pin is the presence of a shaft having a certain length—as will be explained below—for mounting the unlocking part or the lock. If the unlocking part is mounted on the shaft, it too has a displacement part or a displacer contour, which part or contour is capable of pressing the lock—which in this case is mounted in the housing—into its opening position during the closing process—in order thus to permit penetration by the locking pin and, on the other hand, must be capable of being locked with the lock if the latter has returned again to its locking position under the action of the spring. If the lock is mounted on the shaft, the displacement part can be dispensed with, although a tapered contour at its end may facilitate locking. The force required for locking or unlocking is independent of the retaining force of the lock. This is determined only by the form of the lock itself. If the lock used is, for example, a catch, the cross-section of the catch determines the retaining force of the lock. The force required there for locking or unlocking is mainly determined by the spring which presses the catch in the locking direction. This spring can be as strong or as weak as desired without influencing the retaining force.

For the purposes of the invention, spring-loaded locks are understood as meaning all those individual components or components collected together in groups, which are pressed by a spring in their locking direction (vertically to the direction of movement of the locking pin) and which can be pressed into an opening position by a displacer contour and then automatically return again to their locking position. As mentioned above, they can be mounted in the housing or on the locking pin.

For the purposes of the invention, sleeve-like unlocking parts are understood as meaning all those components which are displaceably mounted, in such a way that they cannot be lost, either on the outside of the shaft of the locking pin or on the inside of the housing and have a displacer contour for pushing the lock back into its opening position. In the variant with the lock on the locking pin, the normal extension of this displacer contour with respect to the direction of movement is at least as large as, but preferably greater than, the displacer contour of the locking pin.

Thus, the apparatuses according to the invention have three types of movement:

penetration of the locking pin to the penetration depth behind the lock and the resulting interlocking with the housing;

deeper penetration to the penetration depth of the housing against the force of the spring and consequent opening or spreading apart of the lock by the unlocking part or by the displacer contour of the unlocking part; and subsequent withdrawal of the locking pin—assisted by the force of the spring—into the detached position, the lock—guided by the unlocking part—being capable of sliding over its abutment on the locking pin or in the housing.

The embodiments described include the following additional advantageous features. One embodiment according to the invention is an apparatus having the lock on the locking pin. This apparatus is chosen if the locking pin is to be as small as possible and light-weight (for example, in tool holders). The lock is held on the locking pin, and the unlocking part has on its inner lateral surface a channel which is formed for interaction with the lock. That edge of the housing which faces the locking pin in the open position is beaded inward and forms the displacement part, so that the remaining aperture is smaller than the diameter of the unlocking part or than the width of the lock in the open state. The displacement part is preferably undercut and has a recess for the displacer contour of the unlocking part. The locking pin has at least a partially annular channel or a hole for holding the lock, the lock being in the form of a spring ring in the first case and, in the second case, in the form of at least one spring-loaded catch having a loss prevention means.

The channel ensures that the lock carries the unlocking part as far as the stop during withdrawal, i.e. as far as the displacement part (formed by the inward-flanged housing edge). The connection between the lock and this channel essentially corresponds to that of a conventional ball catch. An annular groove on the locking pin permits the use of a relatively cheap spring as a lock, which can also be easily replaced, while a hole with a catch-like lock is advantageous, especially in a cylindrical locking pins. The channel permits reliable locking and opening in all directions, even with or against gravity.

The following features guarantee absolutely reliable detachment of the apparatus as soon as the unlocking part has displaced the lock.

The extension of the unlocking part at right angles to the direction of movement is greater than that of the displacement part, and the unlocking part has an end surface which faces the displacement part of the locking pin and has an undercut in which the displacement part of the locking pin can be at least partially sunk.

The lock has, in the direction of movement, along its surface closest to the axis of the locking pin, a length which, viewed in the longitudinal direction of the locking pin, approximately corresponds to the length of the displacer contour of the locking pin at its greatest extension.

The guide bevel, usually provided on the displacer contour of the locking pin, automatically interacts with a bevelled entrance of the lock, so that the locking pin is pushed out of the housing. Furthermore, the required travel during unlocking is the minimum. In the embodiment with the lock on the locking pin, during opening the lock interacts with a guide bevel, formed as a displacer contour, on the outer housing edge which acts as a displacement part.

Another object is important particularly in the field of child security of doors: even when locks are present, children frequently acquire keys and thus forbidden access. The object is to prevent this. The last-mentioned object has been achieved for the first time in a simple manner by the following features:

The force of the second spring means in the unlocking direction is established by adjustable means, spring means, a plurality of springs and blocking means.

Depending on the force which has to be overcome to detach the apparatus, springs of corresponding strength can be provided. The adjustable or replaceable springs permit constant adaptation to the prevailing conditions (age of the children), whereas a blocking means permits permanent locking. For the purposes of the invention, blocking means are understood as being rigid components which are clamped parallel to the spring or arranged at right angles to the direction of the movement of the locking pin and can be made to engage the displacement part of the said pin in order to prevent its movement or to prevent the lock from receding.

For the purposes of the invention, suitable springs are any springy material, such as conventional coil springs or rubber springs.

The following features ensure that the spring can be easily replaced and mounted in an uncomplicated manner:

The locking pin has, on its end facing away from the displacement part, a thrust plate which projects the width of the unlocking part at right angles to the direction of movement, and the second spring means is arranged between the housing and the thrust plate in a locked state.

The following features define an optimally integrated solution, a particularly simple constructional form and cheap spring material:

The second spring means is arranged on that side of the lock which faces away from the unlocking pin in an unlocked state.

The following features permit simple and rapid adjustment of the initial tension of the spring, so that this tension can be altered if required (visit by other children, but, for example, reduction of the spring force in the case of users convalescence, etc.):

The force adjustment means comprise a second abutment—which is adjustable in the direction of movement preferably by turning an adjusting screw or screw or an adjusting cam—and the screw can, if required, be operated from the side on which the spring is located. These means are manually displaceable against one end of the second spring means.

The following features represent various constructional variants which likewise guarantee reliable unlocking and have an uncomplicated shape:

The lock is formed from a spring wire which is preferably round and is held securely in a groove in the housing in such a way that it cannot be lost and the unlocking part—which may be capable of being operated as desired by a rod system—has, at its periphery, a channel for spring-actuated interlocking with the lock.

The lock has, in the direction of movement, along its surface closest to the axis of the locking pin, a length which approximately corresponds to at least the distance between the greatest extensions of the displacer contours—at closest approach of these contours.

The rods, which can be operated as desired, can be employed for any special cases where detachment of the apparatus is not to be effected by pressure applied directly to the locking pin.

The following feature represents an optimal constructional form for use in furniture, since the apparatus occupies only a small amount of space:

The housing (in the locked state) is essentially concentric with respect to the axis of the locking pin in the locked state.

The following features define a hose closure or connection in a hose or pipe system as may be used, for example, in watering systems or in hydraulic systems:

The locking pin has an axial hole and is connected to a hose or tube, and the housing is connected to a second hose or tube, the spring being in the form of a sealing ring.

DESCRIPTION OF THE DRAWINGS

The invention is described in detail by means of examples and with reference to diagrams.

FIG. 5 shows three different spring variants for an apparatus according to FIG. 1;

FIG. 6 shows a variant of an apparatus with adjustable spring force and with a cam;

FIG. 7 shows a locking pin having an integral spring;

FIG. 8 shows a detail of FIG. 3;

FIG. 20 shows an embodiment having a spring-braked unlocking part;

FIGS. 30 and 31 show an embodiment having a facility for adjustment of the spring force from the locking part side;

FIG. 32 shows a lock having two retaining projections;

FIG. 36 shows a variant having a catch-like lock on the locking pin.

DETAILED DESCRIPTION OF PREFERRED EMBODIMENTS

Figure 3:
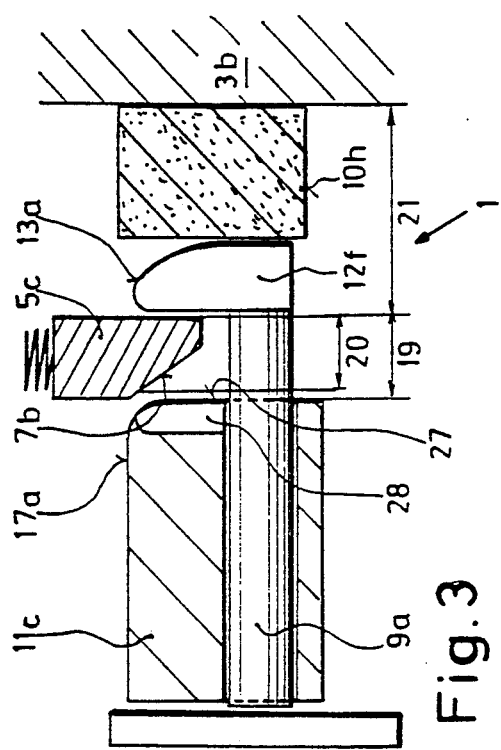
FIG. 3 shows a variant with a hook-like locking pin and recessed unlocking parts.

Identical parts are provided with an identical reference symbol, while similar parts are provided with identical reference symbols and different indices. The Figures are described generally and in relation to one another.

The essential feature of the invention comprises a receiver part 1 and a locking part 2, the latter having a locking pin 9 which, in accordance with FIGS. 1, 2, 4, 6, 7, 9, 13, 16, 18, 19 and 21 to 27, is mushroom-shaped and has a cylindrical shft and a conically widening displacement part 12 which corresponds to the cap of the mushroom and acts as a catch against the direction of movement (arrow 57), as will be described below.

The locking pin 9 according to FIGS. 33 to 36 is cylindrical and without a mushroom cap, since it does not have to perform any displacement.

The locking pin 9a in FIGS. 3 and 8 is hook-shaped, the projecting part of the hook forming the displacement part 12f. The displacement part 12g in FIGS. 21 to 27 has, on its side which faces away from the receiving part 1, a recess 59 for partial acceptance of an unlocking part lid - f, while the other displacement parts 12 possess, in this area, a flat end face in a plane at about 90° to the axis 6 of the locking pin 9.

Figure 10:
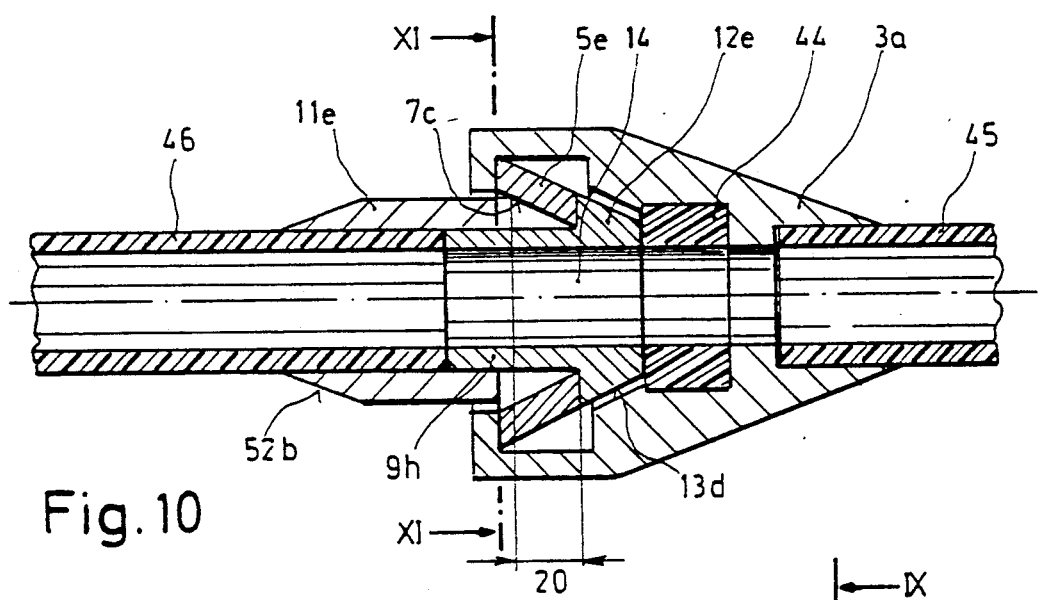
FIG. 10 shows an apparatus of the same type for coupling two hoses.

The displacement part 12e according to FIG. 10 is likewise mushroom-shaped but provided with a hole 14 axially in the center. All displacement parts 12 have a displacer contour 13 which is essentially in the form of a cone envelope or bomb-shaped.

During connection of the parts, the displacer contour 13 serves firstly to push back the lock 5, to push past it in the direction of movement (arrow 57) and then to interlock with it. The displacer contour 13e; f and the displacement part 12; k are not located on the locking pin 9 but are formed on the housing 2n; m. The relevant locks 5k and l are pressed inward by the contours 13e and f, while the locks 5a–i are always pushed outward by the contours 13a–d during locking.

Analogously to the locking pins 9, the locks 5 have a very wide range of embodiments, which are esentially determined by the displacement processes occurring during the locking operation and by the connecting forces to be transmitted between the two parts. The most sturdy embodiment of the lock is shown in FIG. 1, 2 and 9 and 12. In these cases, the lock 5a and 5b, respectively, consists of three indentical elements which are in the form of annular segments and which are centered by a spring or by a rubber ring 16 and are held pressed against the axis 6. As a result of the elasticity of extension of the spring or of the rubber ring 16, the lock 5a and b can thus be pressed apart radially and permit passage of the displacement part 12a or d. Once the broadest part (greatest extension at right angles to the direction of movement) of the displacement part 12a or d has passed, the lock 5a or b closes again due to the spring force of the rubber ring 16. Instead of three ring segments, it is of course also possible to provide a plurality of ring segments or only two ring segments.

Where fewer forces have to be transmitted, simpler one-part locks 5c, as shown in FIG. 3, 6 and 8 are also sufficient. In these cases, the lock 5c is a component having a trapezoidal cross-section.

Figure 14:
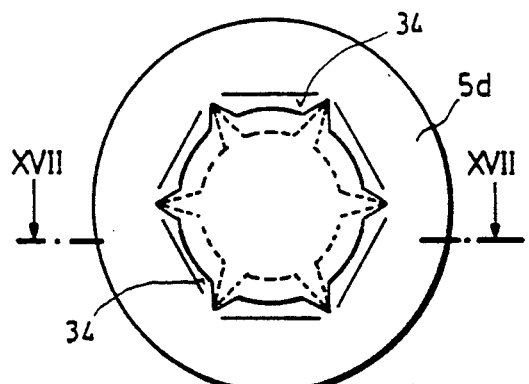
FIG. 14 shows a simple, leaf-like steel spring in the form of a lock.
Figure 17:
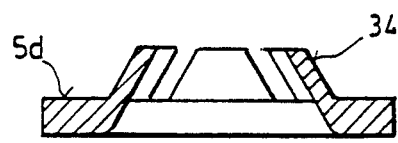
FIG. 17 shows a section along the line XVII—XVII through FIG. 14.

The locks 5d according to FIGS. 14 and 17 are simpler to produce by nevertheless have good force transmission behavior. The locks 5d essentially consist of an annular leaf spring which is in the form of a single piece and has an inner star-shaped incision and in which the cut-in segments 34 are bent at an angle to the plane of the leaf spring. The segments 34 move back under spring force and thus permit passage of the displacement part 12 in the direction of the movement. As soon as the said displacement part has passed, they return to their starting position and thus prevent opening of the apparatus. The lock 5d is produced as a separate component and can be used in a very wide range of constructions.

Figure 4:
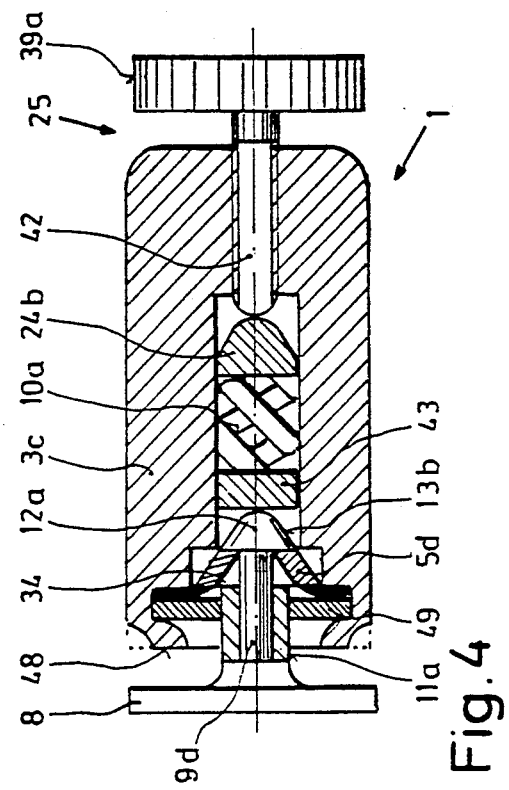
FIG. 4 shows an integral apparatus with spring force adjustment.
Figure 11:
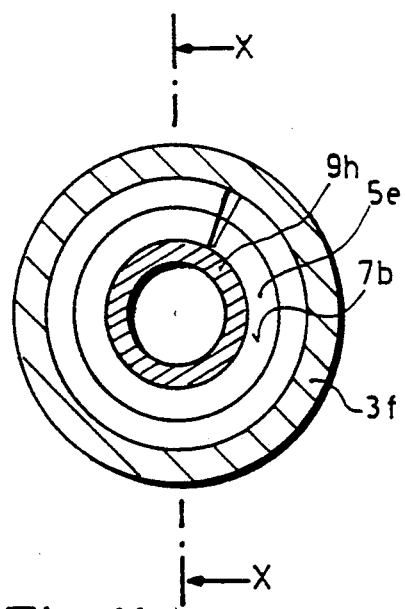
FIG. 11 shows a section along the line XI—XI through FIG. 10.
Figure 12:
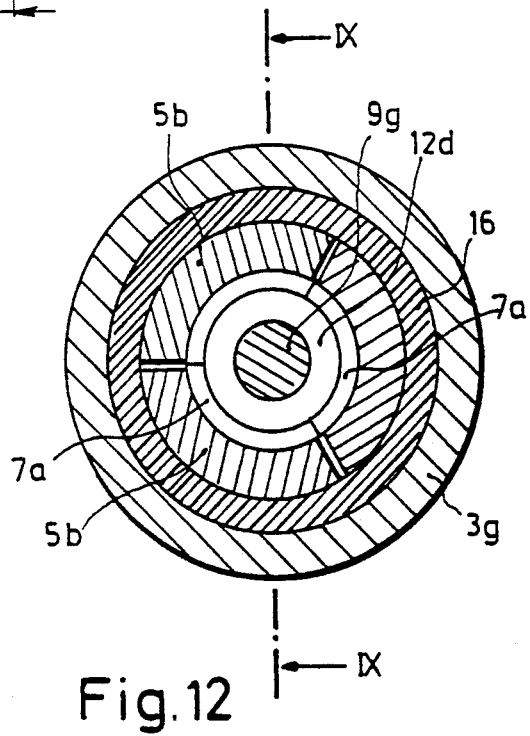
FIG. 12 shows a section through FIG. 9, along the line XII—XII.

Another lock 5e is shown in FIGS. 4, 10 and 11. The lock 5e consists of an open conical spring ring which can be expanded by the displacer contour 13 and springs back to its starting position.

Compared with the locks 5 described previously, the locks 5d and e have the advantage that they are spring-loaded without additional spring elements and are simple to produce.

All variants of the lock 5 described so for have a bevelled entrance 7 which permits displacement of the lock during penetration of the displacement part 12 in the locking direction or direction of movement. The bevelled entrance 7 and the displacer contour 13 which consequently interacts with it are selected so that the friction between the two surfaces is minimal and self-locking is prevented.

Thee weakest embodiment of the lock 5h is obtained if the said lock is formed from spring wire and provided for locking merely with two retaining projections (69). However, such an embodiment, like the variants of the locks 5f, g, i, k, which also consist of a bent spring wire, are the most economical, especially since they are both self-locking and are themselves springy. The bevelled entrance is formed by the generally circular embodiment of the wire cross-section.

The third essential element of the invention is an unlocking part 11, which is arranged, so that it can slide, on the outside 18 of the shaft of the locking pin 9 or on the inner surface 71 of the housing 3m, n (FIGS. 33–36). The unlocking parts 11a, b and d to g corresponding to FIGS. 1; 4 or 2; 7; 9; 10 and 18 and 21 to 27 and 33 to 36 are cylindrical sleeves, while the unlocking part 11c according to FIGS. 3 and 8 is a cubic element having a hole for the shaft of the locking pin 9a. Like the displacement part 12, all variants of the unlocking parts 11 have a displacer contour 17 which, in the simplest case corresponding to FIGS. 1, 2, 4, 6, 7, 9, 10, 16, 18, 19 and 36, consists of a rectangular interlock between that end face of the unlocking part 11 which faces the displacement part 12 and the outside of the said unlocking part.

The displacer contour 17a is preferably rounded, as shown in FIGS. 3 and 8. A sharp edge of the displacer contour 17 may be damaged during frequent contact with the bevelled entrance 7. A rounded area reduces the friction between the bevelled entrance 7 and the displacer contour 17 and thus facilitates closing of the apparatus. Self-locking between the displacer contour 17 and the bevelled entrance 7 is prevented.

In FIGS. 21 to 27 and 33 to 35, the displacer contours 17b; c are conically inclined, similarly to those of the displacement part 12. The locking parts 11d and e have a fin 62 adjacent to the displacer contour 17b or c and, adjacent to this, have a channel 60 or 60b whose curvature preferably corresponds to that of the wire of the lock 5g, h, or k. During unlocking, the displacer contour 17b or c enters the recess 59 or 59a of the displacement part 12g or i and, after passing the width of the fin 62 of the lock 5g; h; k, enters the channel 60; 60b for a short time, so that, during the final opening process, it moves rapidly, under slight initial tension, over the fin 60 or over the gap between the displacement part 12g, i and the unlocking part 11d, e, g. This embodiment optimally takes into account the spring properties of the lock 5g, h, k. A special bevelled entrance is no longer necessary in this embodiment.

The unlocking part 11 is pressed against the bevelled entrance 7 of the lock 5, independently of the closing pin 9c or 9e (FIG. 2 or FIG. 7, respectively) or together with the locking pin 9, so that the said lock moves radially outward until the region of the greatest extension at right angles to the direction of movement of the unlocking part 11 or the displacer contour 17 interlocks with the radially innermost surface 29 (FIG. 6) of the lock 5. In this position, the lock 5 is in its detached position. The locking pin 9, which slides in the unlocking part 11, can be withdrawn until its displacement part 12 reaches that end face of the unlocking part 11 which faces the said displacement part.

If the locking pin 9 is now pulled further outward, the displacement part 12 or the lock 5k; i (FIGS. 33-36) carries the unlocking part 11 with it. In the embodiments according to FIGS. 1-32, the displacement part 12 unclamps he unlocking part 11 from the lock 5. In the variants according to FIGS. 33-36, the displacement part 12i; k prevents removal of the unlocking part 11g; h, and the lock 5k; l is unclamped from the part 11g; h as soon as the unlocking part 11 has left the lock 5, or, conversely, the displacement part 12 takes over the clamping force of the lock 5. However, since he displacement part 12 has its conical or bomb-shaped displacer contour 13, the lock 5, moving further toward the locking position—slides toward the axis 6 and thus in turn pushes the displacement part 12 and hence the locking pin 9 into the completely detached position.

In order for this to function reliably, the extension (20) of the lock 5 in the direction of movement (arrow 27 in FIG. 1) must correspond to no more than the play 19 of the unlocking part 11 in the direction of movement, with respect to the locking pin 9 (see FIG. 3).

Furthermore, the extension 30b of the lock 5 in the direction of movement in its region closest to the locking pin 9 must not be smaller than the minimum distance beteen the greatest extension (33 in FIG. 8) of the displacer contour 17a or of he unlocking part 11c at right angles to the direction of movement and the greatest extension (31b in FIG. 8) of the displacer contour 13a or of the displacement part 12f at right angles to the direction of movement.

Finally, it is of course necessary for the extension of the unlocking part 11 at right angles to the direction of movement to be at least as large as the greatest extension of the displacement part 12 at right angles. In FIGS. 1, 2, 4, 9 and 10, the unlocking parts 11 are shown with about the same external diameter as the displacement parts 12, whereas the unlocking part 11c according to FIGS. 3 and 8 has a slightly larger external diameter than the displacement part 12f and, on its end surface 27 facing the displacement part 12f, has an undercut 28 which is suitable for partially receiving the displacement part 12f. This results in removal of the locking pin 9a from its closed or locked position in an elegant manner during unlockingg, by insertiong of the unlocking part 11c against the bevelled entrance 7b of the lock 5c or after subsequent jamming of the lock 5c against displacer contour 17a. In an embodiment of this type, the lock 5c may be particularly narrow (viewed in the direction of movement of the locking pin).

All variants have a spring, which is shown by way of example in FIGS. 1 to 18 and 23, 30, 31 and 36. the spring 10 offers spring resistance to insertion of the locking pin 9 or at least to insertion of the unlocking part 11.

Figure 1:
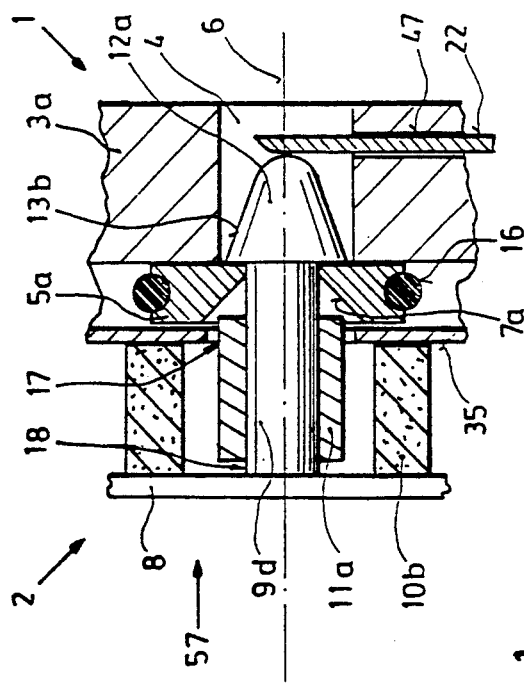
FIG. 1 shows a lateral section through an apparatus according to the invention, having a mushroom-shaped locking pin.
Figure 18:
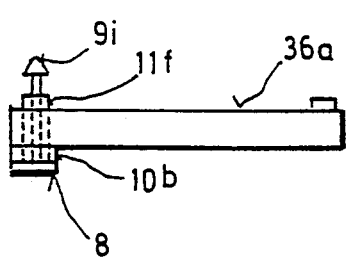
FIG. 18 shows a door having another locking pin mounting.

FIGS. 1 and 18 show a spring 10b which is fastened to thrust plate 8 which is mounted on the shaft of the locking pin 9d and projects radially beyond the latter. The spring 10b is formed from a sleeve-like elastomer, for example an expanded elastomer, and is arranged concentrically with respect to the shaft of the locking pin 9d. It is adhesively bonded to that end surface of the thrust plate 8 which faces the displacement part 12d.

The spring 10b can, if required, be replaced at any time by a spring having different spring characteristics but about the same dimensions (10c, 10d) (see FIG. 5). This makes it possible to achieve settings which differ in spring force and which make locking or detachment of the apparatus more difficult or easier.

On the side facing away from the thrust plate 8, the spring 10b is supported in the closed state on the outer wall 35 of the housing 3a which has the lock 5a and a hole 4 for the locking pin 9d or its displacement part 12a.

In the variant according to FIG. 18, the spring 10b is supported, on its side which faces away from the thrust plate 8, against the edge of a hole in a door 36a. In this application, the spring is fastened, for example adhesively bonded, both to the thrust plate 8 and to the door 36a and thus holds the locking pin 9e in such a way that it cannot be lost. The hole in the door 36a is sufficiently wide so that the unlocking part 11f is also accepted therein and is not hindered in its sliding movement along the shaft of the locking pin 9i. In the variant according to FIG. 18, the locking or unlocking movement is thus performed by direct pressure on the thrust plate 8, whereas in the variant according to FIG. 1, in the case of a door closure, the thrust plate 8 is fastened to, or integrated with, the inside of a door, and locking or unlocking thus takes place as a result of pressure on the door itself. Such a variant is indicated in FIG. 16 on the door 36b.

Figure 15:
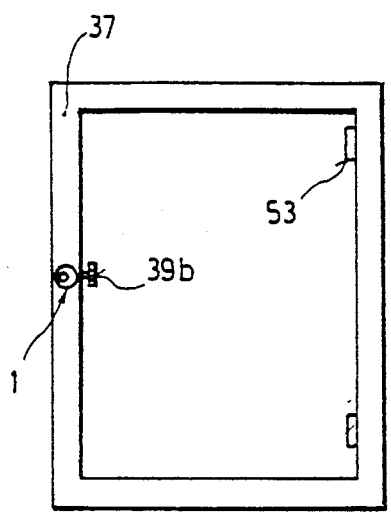
FIGS. 15 and 16 show an article of furniture having the locking apparatus according to the invention, in one case without a door, as an elevation, and in the other case with a door, as a plan view.
Figure 16:
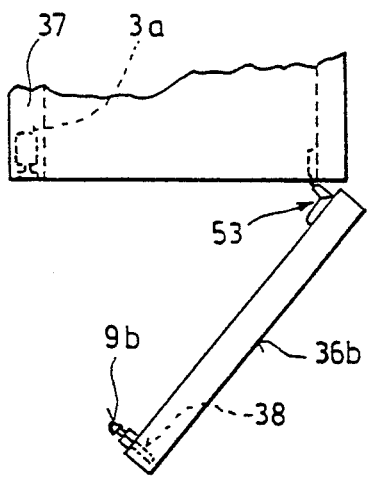

In the case of FIGS. 15 and 16, the housing 3a is integrated in the door frame 37. A converse embodiment, in which the locking pin is fastened to the door frame and the housing is held in the door, is of course also possible in special cases. In both cases, a thrust plate 8 may be dispensed with if that end 38 of the shaft 9b which faces away from the displacement part 12 is in the form of, for example, a screw, as indicated in FIG. 16. In such a case, however, fastening of a sleeve-like spring 10b is also disadvantageous, so that one of the spring variants described below is used.

Figure 2:
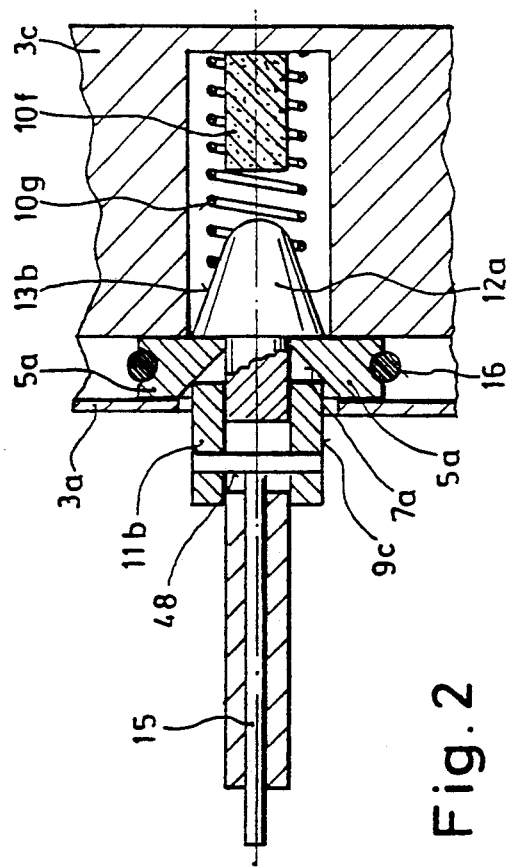
FIG. 2 shows a variant of this with separately controllable unlocking part.

In FIGS. 2 to 4, 6, 9 to 13, 15, 16, 23, 33 and 36 the spring force is provided by a spring 10 which is located inside the housing 3 and is in the form of a coil spring (10a in FIGS. 4; 10g in FIG. 2), a sleeve-like foam spring (10c in FIG. 6) or a block-like foam spring (10h; l in FIGS. 3; 33; 36). FIG. 2 also shows a cylindrical foam spring 10f which is inserted into the flat spiral spring 10g to reinforce the spring force of the said spiral spring.

Figure 23:
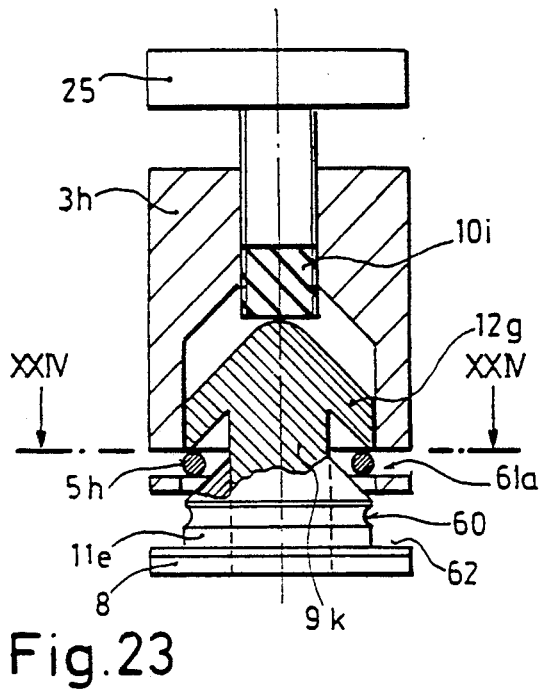
Figure 24:
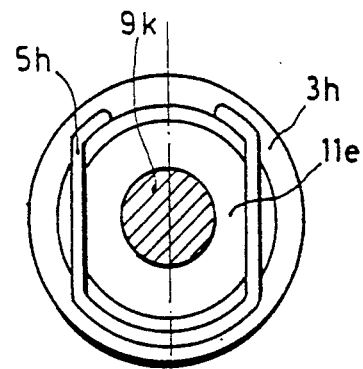
Figure 25:
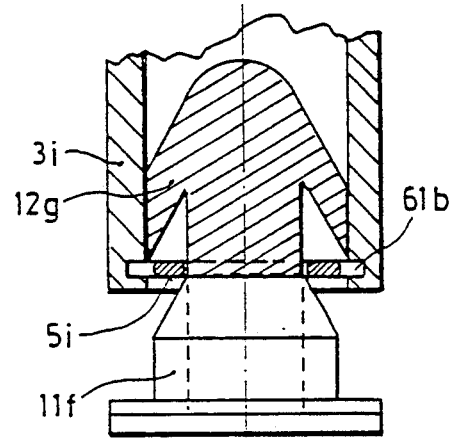
Figure 26:
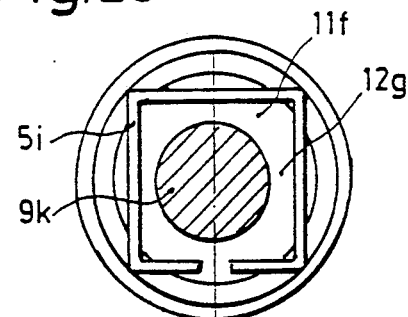
Figure 27:
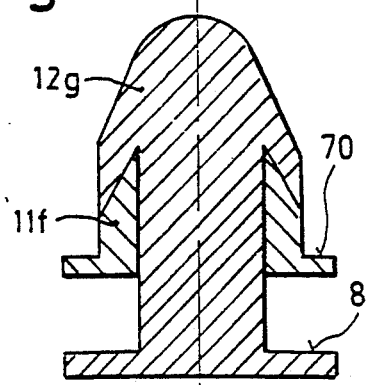
Figure 33:
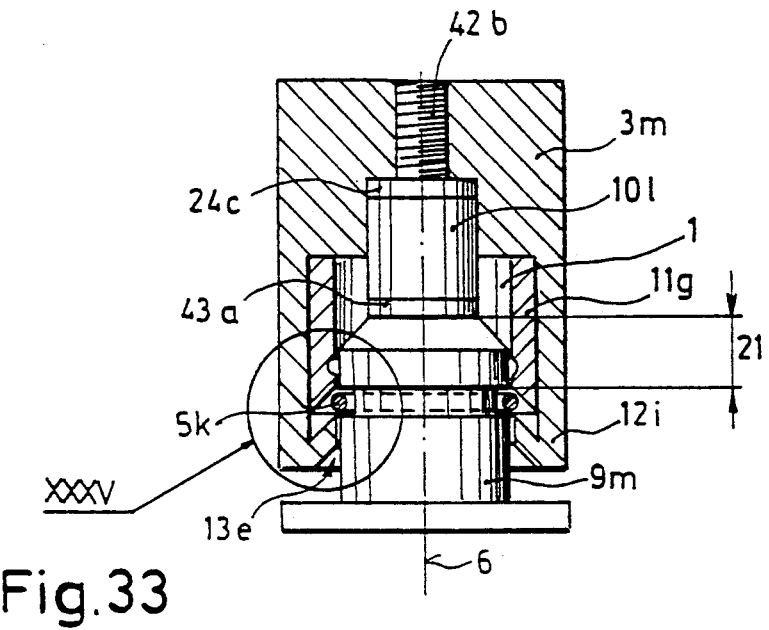
FIG. 33 shows an embodiment having a lock on the locking pin.
Figure 34:
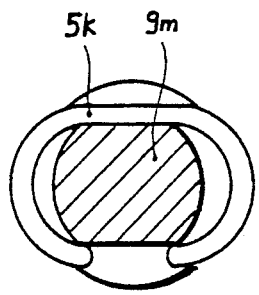
FIGS. 34 and 35 show details of this.
Figure 35:
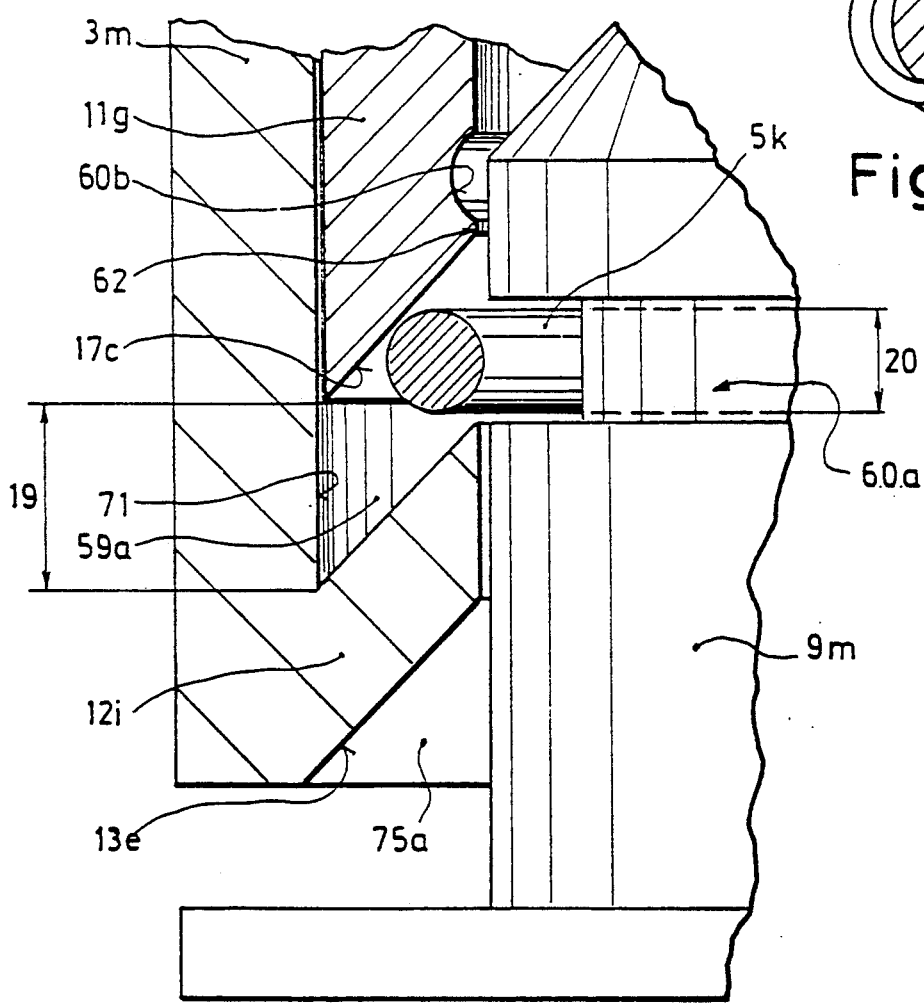

All springs 10 can be replaceable or, as shown in FIG. 2, reinforceable. However, FIGS. 4, 6 and 23 show preferred variants in which the spring force is adjustable by means of an adjusting screw 25 or an adjusting cam 26. adjustment is effected by turning an adjusting knob 39, which is connected via a shaft 40 to a cam 41 (FIG. 6), or is in the form of a screw 42 and is screwed in a thread in the housing 3c. Both the cam 41 and the screw 42 rest against an abutment 24a; b; c for the spring 10c; a; l. FIGS. 4 and 33 show a further abutment 43; 43a, which is provided at that end of the spring 10a; l which faces away from the abutment 24b; c and forms the transition between the displacement part 12a or the locking pin and the spring 10a; l.

Another particularly advantageous method of adjusting the spring force is provided by the embodiment according to FIGS. 30 and 31, since the adjustment can be made there by means of a screwdriver 68 from the side on which the locking part 2 is located. A screw 42a carries a rubber-sandwich washer 66a made of metal, to which the rubber spring 10k is adhesively bonded. A rubber-sandwich washer 66b in which a screw slot 67 or a cross slot is formed is likewise adhesively bonded to the other end of the spring 10k. The screw 42a is screwed into a thread in the housing 3k in such a way that the said screw is adjustable.

FIG. 7 shows a variant in which the locking pin is divided into two parts 9e and 9f. The parts of the locking pin 9e and 9f are undetachably connected to a spring 10e at their separation points. The unlocking part 11e forms a bridge between the two parts 9e and 9f. The part 9e, which carries the displacement part 12c, is thus connected to the part 9f in such a way that the said part 9e cannot be lost, part 9f in turn carrying the thrust plate 8. When the apparatus is opened, the thrust plate 8 is subjected to pressure, as described above, whereupon the distance between the two parts 9e and 9f decreaes against the force of the spring 10e, so that the unlocking part 11e is pushed agninst the bevelled entrance (not shown) of the lock.

FIG. 10 shows a rubber seal 44, which also has a springy action. The rubber seal 44 forms a transition between the drilled-through displacement part 12e and the housing 3g, which in turn is tightly connected to a hose 45. Since the drilled-through locking pin 9h is just as tightly connected to a hose 46, there is an unobstructed internal passage between the hoses 45 and 46 in the locked state in the variant according to FIG. 10.

All housings 3 shown in FIGS. 1-32 having suitable recesses for accepting the lock 5 and for accepting the locking pin 9, this requiring a penetration depth 21 which corresponds at least to the length of the displacement part 12f and the play 19 of the unlocking part 11c at the locking pin 9a (see FIG. 3).

Regarding the further details of the embodiments: The variant according to FIG. 1 has, in its housing 3a, a slot 47 which projects radially outward from the axis 6 and holds a displaceable blocking means 22 which has an approximately rectangular cross-section and with the aid of which the penetration movement of the locking pin 9 can be prevented. The blocking means 22 could also be connected to a lock (not shown), so that only persons possessing a suitable key have access. Another blocking means could also be provided parallel to the spring 10b.

In the variant according to FIG. 2, the unlocking part 11b is connected to a rod system 15 which is guided in a hole in the shaft of the locking pin 9c, axially with respect to the latter. In the region of the unlocking part 11b, the locking pin 9c has a slot 48 in which two parts of the rod system 15 which project radially outward are displaceable in the direction of movement. These outward-projecting parts of the rod system 15 are rigidly connected to the unlocking part 11. Pressure in the direction of movement (arrow 57) on the rod system 15 thus causes displacement of the unlocking part 11b toward the bevelled entrance 7a of the lock 5a and thus results in unlocking. This variant can be provided wherever undesirable pressures may be exerted on the locking pin, so that even accidental locking could occur. In this case, however, two-hand operation is required.

The housing 3c according to the variant in FIG. 4 is a molded part which possesses, at its end facing the thrust plate 8, an edge 48 which, during assembly of the receiving part 1, i.e. during installation of all parts in the housing 3c, is pressed inward. The original state is shown as a dot-dash line. As a result of pressing the edge 48 inward, a washer 49 is pressed against the spring ring, which is in the form of a lock 5e, so that the said spring ring is fixed permanently in the housing 3c in such a way that it cannot be lost. Although the ring has vertical play, this does not present problems, owing to the displacer contours 13, 17.

For the installation of a receiving part 1 or the housing 3 in a door or door frame, it is also possible to provide a thread in the periphery of the housing 3c, so that the housing can be screwed in.

Figure 28:
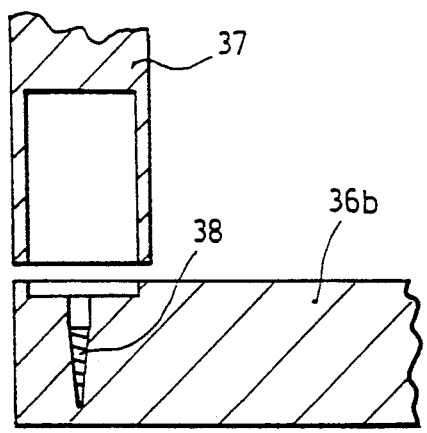
FIGS. 28 and 29 show details of the receiver for a housing of an apparatus according to the invention.
Figure 29:
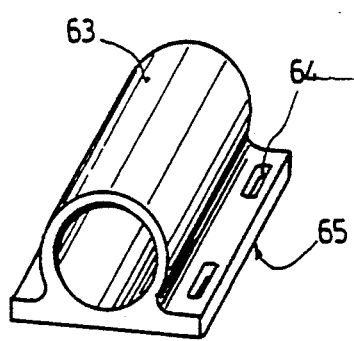

In this context, also see FIG. 28 with the door frame 37 and a door 36b, which is provided with a blind hole for the end 38 of a locking part 2. If the receiving part 1 cannot be inserted into the door frame, a receiving sleeve 63 according to FIG. 29 is provided, the said sleeve having, in its base surface 65, slots 64 for screw connection to the door frame or the like. Any receiving pieces 1 can be inserted, preferably screwed, in such a receiving sleeve 63. A receiving part 1 according to FIG. 31 is optimal for this purpose.

The springs 10b to 10d according to FIG. 5 are made of the same material and are of different thicknesses (10b and 10c) or are made of an unexpanded elastomer which has wedge-shaped receiving rings for controlling the spring characteristics (10d).

The spring 10c in the variant according to FIG. 6 is held in the housing 3d by retaining collars 49, coaxially with respect to the axis 6 of the locking pin 9b. The lock 5c is held by a known measure (not shown) in the housing 3d in such a way that it cannot be lost, so that it is not lost after the locking pin 9b has been removed. It is pressed toward the axis 6 by a flat spiral spring 50. The displacer contours 13c and 13d of the displacement part 12b and 12c in FIG. 6 and 7 are entirely conical, in contrast to the other displacer contours.

Figure 9:
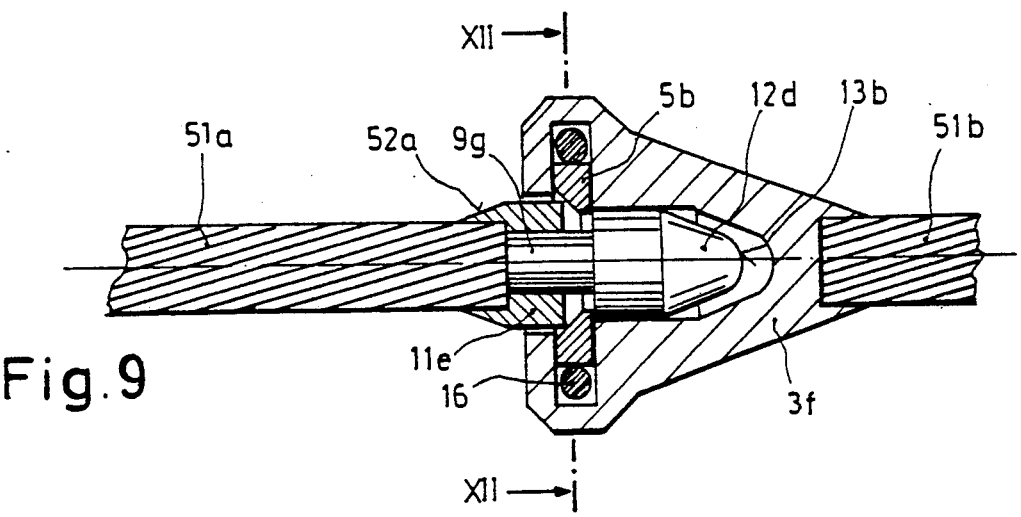
FIG. 9 shows an apparatus according to the invention, for coupling two ropes.

The variant according to FIG. 9 and 11 is used for detachably locking two rope ends 51a and b, the rope end 51a being soldered to the locking pin 9g, and the rope end 51b to the housing 3f. The unlocking part 11e has a conical bevelled grip 52, which makes it easier to press the said unlocking part against the lock 5b. Such a bevelled grip 52b is formed on the locking part 11e in the hose coupling according to the variant in FIG. 10.

FIG. 15 and 16 show schematic hinges 53 for mounting a door 36. An adjusting mechanism according to FIG. 6 is indicated by the rotary knob 39b. The receiving part 1 consists of the housing 3 and the lock 5 and is sunk in the door frame 37.

Figure 19:
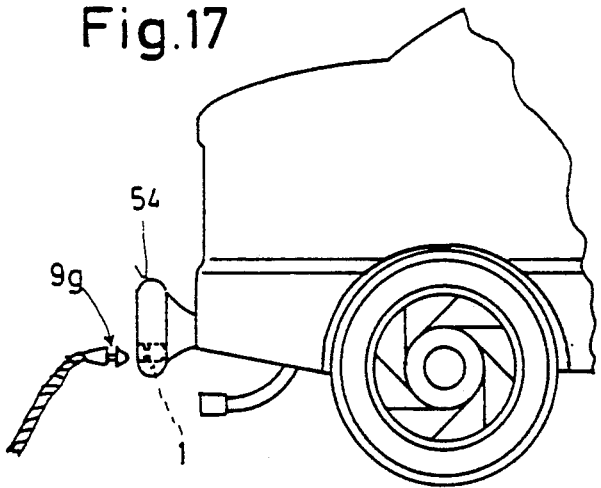
FIG. 19 shows a schematically represented vehicle tail with mounted apparatus for fastening a towing rope.

The vehicle tail shown in FIG. 19 has an impact means 54 in which a receiving part 1 is integrated. With a locking pin 9g corresponding to FIG. 9, it is thus possible to connect a tow rope or the like to the impact means 54 in a very simple manner.

Such rope insertion means are also used in trucks for securing the load.

Figure 13:
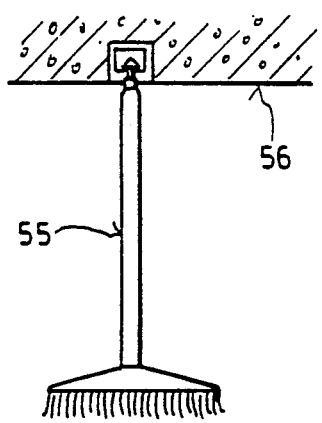
FIG. 13 shows a suspension apparatus for a household appliance.

FIG. 13 shows a broom 55 which is shown, by way of example, attached to a ceiling 56 by means of an apparatus according to the invention. Of course, a very wide range of articles can be fastened in this manner.

The unlocking part 11c according to FIG. 20 shows an additional spring 58, which is stretched between the displacement part 12 and the unlocking part 11c. This additional spring 58 thus secures the starting position of the unlocking part 11c. The unlocking part 11c is thus in principle in the position facing away from the displacement part 12 and is not pressed against the lock 5 until the desired unlocking pressure is exerted on the locking pin 9. For better guidance of the additional spring 58, the unlocking part 11c has a concentric undercut which faces the unlocking pin 9 and holds the additional spring 58.

Figure 21:
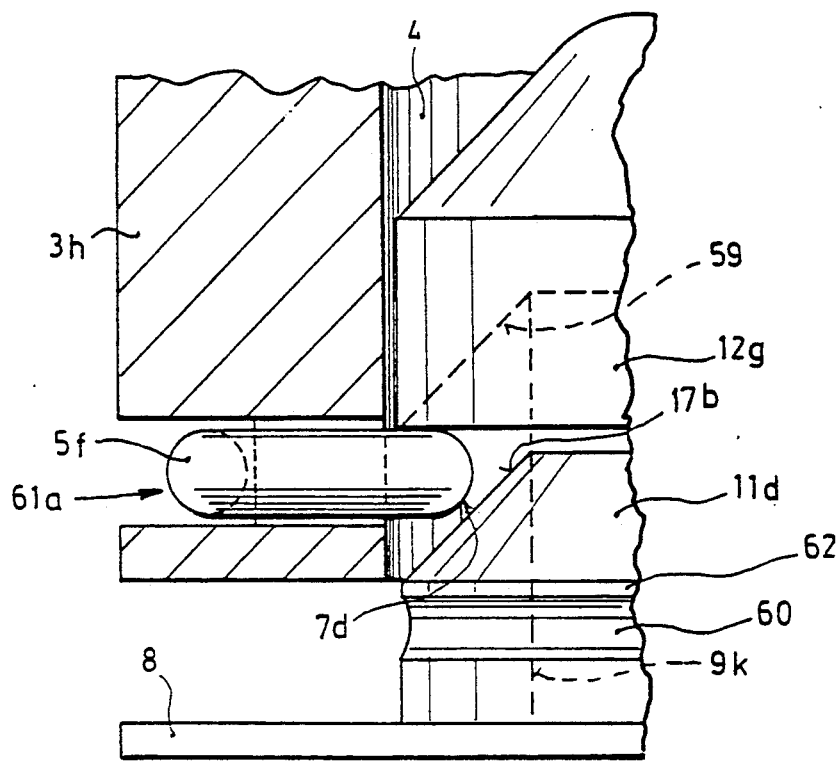
FIGS. 21 to 27 show embodiments having a spring as a lock.

The housing 3h according to FIG. 21 has a groove 61a in its outside, which groove holds the lock 5f so that it cannot be lost. The lock 5f may be similar to the lock 5h in FIG. 24.

Figure 22:
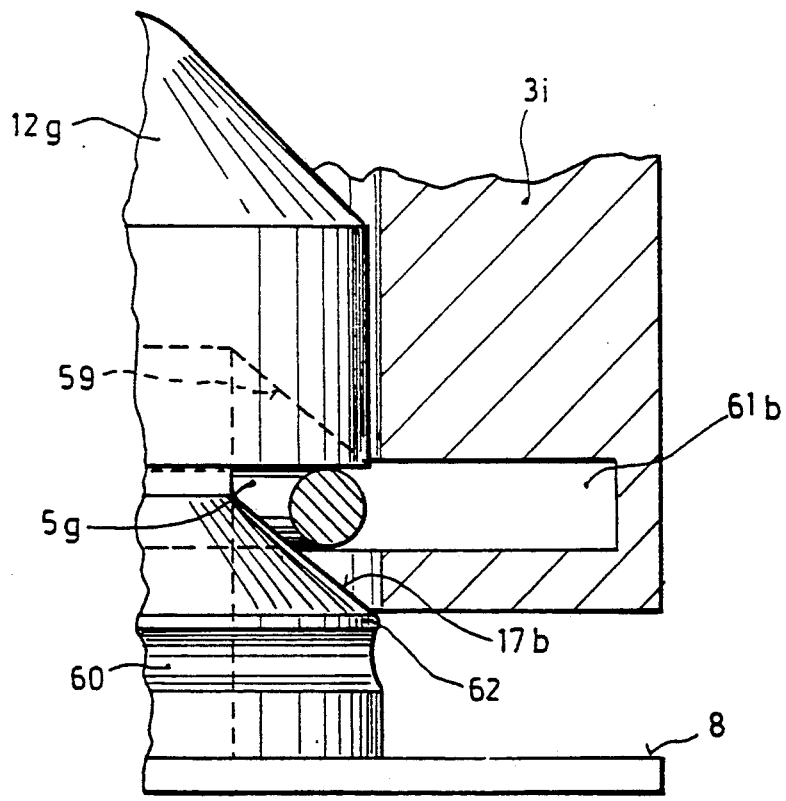

The housing 3i in FIG. 22 has a groove 61b in its inside. The lock 5g projects into this groove 61b at two or more points and is thus held there in such a way that it cannot be lost. The remaining areas of the groove 61b serve as diversions during locking or unlocking.

The invention is not restricted by the Figures shown and by the description. Thus, for example, it is also possible to provide annular spiral springs instead of the rubber spring 16. For particular applications, the lock 5 could itself be made of resilient material so that it permits penetration of a locking pin or can be unlocked by the unlocking part 11.

The bordering part of the housing 3i adjacent to the groove 61b could also be formed by beading the edge, possibly after insertion of a shim to ensure freedom of movement for the lock 5g.

The embodiments of the apparatuses of FIG. 33-36, which differ from all the examples described so far, are the opposite technical solutions to the principle described in FIG. 1-32, as mentioned above. The locks 5k and 5l are held on the locking pin 9m or 9n in a channel 60a or in a hole 74. In their locked position, these locks 5k; l interlock with a displacement part 12i; k, which is formed on the housing 3m; n. The mode of operation and the locking strength are essentially identical to those of the other variants. The locks 5k, l shown are described merely by way of example and could be formed by any other locks, such as, for example, leaf springs, cam catches, ball catches or the like.

FIG. 36 shows how catch-like locks 5l can be prevented from being lost: the loss prevention means 72 essentially has a threaded pin for each catch-like lock 5l, the said threaded pin being capable of being turned in the locking pin 9m, for example by means of a screwdriver 68, and having a length with which it engages the hole 74 or a slot-like recess 76 of the lock 5l. Although the lock 5l is pressed by a spring 77 in the locking direction and hence outward, it is prevented from falling completely out of the hole 74 by the threaded pin. The lock 5l has a catch-like bevelled leading surface, so that the unlocking part 11h need not be bevelled on its front surface. A channel 60c in the inner lateral surface 73 of the unlocking part 11h serves in this case too for bracing the lock 5l so that the latter or the locking pin 9n can pull the unlocking part 11h against the displacement part 12k.

I claim:

1. Apparatus for detachably connecting two parts including a locking pin and a receiving part for receiving a locking pin when the locking pin is moved in an insertion direction, the apparatus comprising,
a displacement part on one of the parts having a first displacer contour and a first abutment means,
a spring-loaded lock on the other of the parts being moveable by the displacement part when the locking pin is moved in said insertion direction from a locking position against its spring-load into an unlocking position, and upon further insertion of the locking pin the lock being moveable into a locking position engaging the first abutment means thereby preventing removal of the locking pin from the receiving part,
first spring means for biasing the spring-loaded lock into the locking position,
second spring means acting against movement of the locking pin in the inserting direction,
force adjusting means for adjusting the force of the second spring means,
second abutment means on one of the parts,
a sleeve-like unlocking part supported securely by one of the parts and retained by the first abutment means in one direction along the locking pin and the second abutment means in the opposite direction and having a second displacer contour mounted so that it is moveable along the locking pin, the minimum penetration depth of the locking pin into the receiving part corresponding to the extension of the displacement part in the direction of movement of the locking pin plus clearance and the depth of the spring-loaded lock in the direction of movement of the locking pin so that when the locking pin is moved further in said insertion direction the sleeve-like unlocking part urges the spring-loaded lock away from the first abutment means thereby allowing the locking pin to be removed from the receiving part.

2. Apparatus as claimed in claim 1 wherein the force of the second spring means in the direction against movement of the locking pin in the inserting direction is established by means selected from the group consisting of adjustable means, spring means, a plurality of springs and blocking means.

3. Apparatus as claimed in claim 2 wherein the locking pin has, on its end facing away from the displacement part, a thrust plate which projects the width of the unlocking part at right angles to the direction of movement, and wherein the second spring means is arranged between the housing and the thrust plate in a locked state.

4. Apparatus as claimed in claim 2, wherein the second spring means is arranged on that side of the lock which faces away from the locking pin in an unlocked state.

5. Apparatus as claimed in claim 1 wherein the force adjustment means comprise a second abutment means manually displaceable against one end of the second spring means.

6. Apparatus as claimed in claim 1 wherein extension of the unlocking part at right angles to the direction of movement is greater than that of the displacement part, and the unlocking part has an end surface which faces the displacement part of the locking pin and has an undercut in which the displacement part of the locking pin can be at least partially sunk.

7. Apparatus as claimed in claim 1 wherein the lock has, in the direction of movement, along its surface closest to the axis of the locking pin, a length which, viewed in the longitudinal direction of the locking pin, approximately corresponds to the length of the displacer contour of the locking pin at its greatest extension.

8. Apparatus as claimed in claim 1 wherein the other of said parts includes a housing and the lock is formed from a spring wire which is held securely in a groove in the housing and the unlocking part has, at its periphery, a channel for interlocking with the lock.

9. Apparatus as claimed in claim 1 wherein the lock has, in the direction of movement, along its surface closest to the axis of the locking pin, a length which approximately corresponds to at least the length of the displacer contour viewed in the longitudinal direction of the locking pin.

10. Apparatus as claimed in claim 1 wherein the other of the parts includes a housing that is essentially concentric with respect to the axis of the locking pin in the locked state.

* * * * *